(12) United States Patent
Viets et al.

(10) Patent No.: US 8,187,456 B2
(45) Date of Patent: *May 29, 2012

(54) HYDROCRACKING OF HEAVY FEEDSTOCKS WITH IMPROVED HYDROGEN MANAGEMENT

(75) Inventors: John W. Viets, Fairfax, VA (US); Narasimhan Sundaram, Fairfax, VA (US); Bal K. Kaul, Fairfax, VA (US); David L. Stern, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 583 days.

This patent is subject to a terminal disclaimer.

(21) Appl. No.: 11/795,552

(22) PCT Filed: Jan. 23, 2006

(86) PCT No.: PCT/US2006/002296
§ 371 (c)(1), (2), (4) Date: Apr. 29, 2009

(87) PCT Pub. No.: WO2006/079028
PCT Pub. Date: Jul. 27, 2006

(65) Prior Publication Data
US 2011/0100873 A1    May 5, 2011

Related U.S. Application Data

(60) Provisional application No. 60/645,713, filed on Jan. 21, 2005, provisional application No. 60/752,724, filed on Dec. 21, 2005.

(51) Int. Cl.
*C10G 49/22* (2006.01)
(52) U.S. Cl. .......... 208/111.3; 208/108; 208/111.35
(58) Field of Classification Search .......... 208/108, 208/109, 110, 111.01, 111.3, 111.35, 112
See application file for complete search history.

(56) References Cited

U.S. PATENT DOCUMENTS

| | | | |
|---|---|---|---|
| 3,700,585 A * | 10/1972 | Chen et al. | 208/111.15 |
| 4,194,892 A | 3/1980 | Jones et al. | |
| 5,540,758 A | 7/1996 | Agrawal et al. | |
| 6,063,161 A | 5/2000 | Keefer et al. | |
| 6,361,583 B1 * | 3/2002 | Pinnau et al. | 95/45 |

(Continued)

FOREIGN PATENT DOCUMENTS

EP    1004343    5/2000

(Continued)

OTHER PUBLICATIONS

R. Farrauto, S. Hwang, L. Shore, W. Ruettinger, J. Lampert, T. Giroux, Y. Liu and O. Llinich, "New Material Needs for Hydrocarbon Fuel Processing: Generating Hydrogen for the PEM Fuel Cell," Annual Review of Materials Research, vol. 33: 1-27 (Volume publication date Aug. 2003).

*Primary Examiner* — Walter D Griffin
*Assistant Examiner* — Renee E Robinson
(74) *Attorney, Agent, or Firm* — Henry E. Naylor; Bruce M. Bordelon

(57) ABSTRACT

An improved process for hydrocracking heavy petroleum feedstocks wherein hydrogen-containing streams associated with a hydrocracker are subjected to rapid cycle pressure swing adsorption having a cycle time of less than 30 S.

23 Claims, 3 Drawing Sheets

U.S. PATENT DOCUMENTS

| | | |
|---|---|---|
| 6,406,523 B1 | 6/2002 | Connor et al. |
| 6,451,095 B1 | 9/2002 | Keefer et al. |
| 6,488,747 B1 | 12/2002 | Keefer et al. |
| 6,533,846 B1 | 3/2003 | Keefer et al. |
| 6,565,635 B2 | 5/2003 | Keefer et al. |
| 6,607,584 B2 | 8/2003 | Moreau et al. |
| 2004/0255778 A1 | 12/2004 | Reddy |

FOREIGN PATENT DOCUMENTS

| | | |
|---|---|---|
| WO | 03068366 | 8/2003 |

* cited by examiner

HYDROCRACKING OF HEAVY FEEDSTOCKS WITH IMPROVED HYDROGEN MANAGEMENT

This application claims priority to U.S. Provisional Application 60/645,713, filed Jan. 21, 2005, and U.S. Provisional Application 60/752,724, filed Dec. 21, 2005, the contents of which are incorporated herein by reference.

FIELD OF THE INVENTION

An improved process for hydrocracking heavy petroleum feedstocks wherein hydrogen-containing streams associated with a hydrocracker are subjected to rapid cycle pressure swing adsorption having a cycle time of less than one minute unit.

BACKGROUND OF THE INVENTION

The hydrocracking of heavy petroleum fractions is a very important refining process that makes it possible to increase the refinery yield of lower boiling higher value liquid products. For example, heavy feedstocks that cannot be readily upgraded are hydrocracked to lighter fractions such as gasolines, jet fuels and light gas oils. Certain hydrocracking processes make it possible to also obtain a strongly purified residue that can provide good bases for lube oils. Relative to fluid catalytic cracking, an advantage of catalytic hydrocracking is to provide middle distillates, jet fuels and gas oils of very good quality. Conversely, the gasoline that is produced by hydrocracking has a lower octane rating than gasoline that is produced from fluid catalytic cracking.

Hydrocracking is a process that draws its flexibility from several variables, such as the operating conditions used, the type of catalyst used, and the fact that the hydrocracking of hydrocarbon-containing feedstocks can be carried out in one or more stages. One type of conventional hydrocracking catalyst is based on moderately acidic amorphous substrates, such as silica-aluminas. Such systems are used to produce quality middle distillates and optionally lube oil basestocks. These catalysts are used, for example, in two-stage processes.

In processes such as hydrocracking, the step of recycling a hydrogen-rich vapor phase separated from the reaction zone effluent is common. Practical reasons for utilizing this step reside in maintaining both the activity and operational stability of the catalyst used in the process. The recycled hydrogen is typically obtained by cooling the total reaction product effluent to a temperature in the range of about 60° F. (15.6° C.) to about 140° F. (60° C.), and introducing the cooled effluent into a vapor-liquid separation zone. The recovered vapor phase, which contains unreacted hydrogen, is recycled and combined with the hydrocarbon feedstock upstream of the reaction zone.

The art has long recognized the importance of improving the purity (concentration) of hydrogen in the recycle stream of hydroprocessing units, including hydrocracking units. Thus, it has been the goal of the art to provide enhanced efficiencies of hydrogen utilization with little additional energy consumption and without undue deleterious effects on the maintenance or operation of the hydrocracking equipment. It has also been recognized that by increasing the efficient use of hydrogen, existing equipment could be employed to increase the throughput of the feedstock resulting in higher product yields. A further advantage to the more efficient utilization of hydrogen is the reduction in the amount of make-up hydrogen that must be provided by, for example, a hydrogen plant or cryo-unit.

The type of feedstock to be processed, product quality requirements, and the amount of conversion for a specific catalyst cycle life determines the hydrogen partial pressure required for the operation of a hydrocracking unit. The unites operating pressure and the recycle gas purity determine the hydrogen partial pressure of the hydrotreating unit. Since there is limited control over the composition of the flashed gas from the downstream hydrocracker separator, the hydrogen composition of the recycle flash gas limits the hydrogen partial pressure ultimately delivered to the hydrocracking reactor. A relatively lower hydrogen partial pressure in the recycle gas stream effectively lowers the partial pressure of the hydrogen gas input component to the reactor and thereby adversely affects the operating performance with respect to product quantity and quality, catalyst cycle life, etc. To offset this lower performance, the operating pressure of the hydrocracking reactor has to be increased. Conversely, by increasing the efficiency of hydrogen gas recovery and hydrogen concentration, the hydrogen partial pressure of the recycle gas stream is improved. This results in an overall improved performance of the hydrocracking process unit as measured by these parameters.

Various methods have been proposed, some of which have been commercially practiced, that attempt to improve the hydrogen utilization efficiency of the hydrocracking unit by increasing the concentration of the hydrogen in the recycle gas stream. Such processes typically result in significant additional equipment costs and/or require significant changes in operating conditions, such as temperature and pressure, which typically results in increased capital and operating costs.

One process that has been adopted to improve the hydrogen purity of the recycle stream is conventional pressure swing adsorption (PSA). See, for example, U.S. Pat. No. 4,457,384 issued Jul. 3, 1984 to Lummus Crest, Inc. However, in order to incorporate the PSA unit, the pressure of the reactor effluent gas stream must be reduced from about 2,500 psig (175.8 kg/cm$^2$) to about 350 psig (24.6 kg/cm$^2$). Although the purity of the recycle hydrogen stream can be increased to about 99 mol %, the recycled gaseous stream must be subjected to significant recompression to return it to 2,500 psig (175.8 kg/cm$^2$) before introduction into the hydroprocessor feed stream. The net result is that the capital, operating and maintenance costs are substantially increased by the addition of a large compressor that is required when using a conventional PSA unit.

Another method is described in U.S. Pat. No. 4,362,613 to MacLean which uses membranes with pressure drops up to 150 atmospheres and which also incurs substantial capital investment and operating costs.

It is therefore an object of the present invention to provide an improved process for enhancing the efficiency of hydrogen utilization by means that are compatible with existing hydrocracking units. Such means adversely affect the hydrocracker throughput or the overall economies of the system, including capital expenditures and operating expenditures, the latter including maintenance and energy consumption.

As previously noted, the overall operating efficiency of the hydrocracking process unit can be increased if the partial pressure of hydrogen gas in the feed to the reactor can be increased. It is therefore another object of the present invention to improve the operating performance of hydrocracking process units by increasing its throughput capacity.

SUMMARY OF THE INVENTION

This invention includes a process for hydrocracking a hydrocarbon feed, comprising:

(a) contacting a hydrocarbon feed in a hydrocracking zone with a hydrogen-containing gas and a catalytically effective amount of a hydrocracking catalyst under hydrocracking conditions thereby resulting in a lower boiling hydrocarbon liquid phase and a vapor phase containing hydrogen and light hydrocarbons;

(b) separating the lower boiling hydrocarbon liquid phase and the vapor phase;

(c) removing at least a portion of the light hydrocarbons from at least a portion of the vapor phase, thereby increasing its hydrogen concentration, in a rapid cycle pressure swing adsorption unit containing a plurality of adsorbent beds and having a total cycle time of less than about 30 seconds and a pressure drop within each adsorbent bed of greater than about 5 inches of water per foot of bed length; and (d) recycling at least a portion of the vapor phase of step c) above having an increased concentration of hydrogen to the hydrocracking zone.

In another embodiment, the hydrogen-containing gas to the hydrotreating zone is comprised of a purified make-up gas produced from a hydrogen-containing make-up gas in a rapid cycle pressure swing adsorption unit containing a plurality of adsorbent beds and having a total cycle time of less than about 30 seconds and a pressure drop within each adsorbent bed of greater than about 5 inches of water per foot of bed length, wherein the purified make-up gas from the rapid cycle pressure swing adsorption unit is higher in hydrogen concentration than the hydrogen-containing gas.

In another embodiment, is a process for hydrocracking a hydrocarbon feed, comprising:

(a) contacting a hydrocarbon feed in a hydrocracking zone with a hydrogen-containing gas and a catalytically effective amount of a hydrocracking catalyst under hydrocracking conditions thereby resulting in a lower boiling hydrocarbon liquid phase and a vapor phase comprised of hydrogen and light hydrocarbons; wherein the purified make-up gas is produced from a hydrogen-containing make-up gas in a rapid cycle pressure swing adsorption unit containing a plurality of adsorbent beds and having a total cycle time of less than about 30 seconds and a pressure drop within each adsorbent bed of greater than about 5 inches of water per foot of bed length, wherein the purified make-up gas from the rapid cycle pressure swing adsorption unit is higher in hydrogen concentration than the hydrogen-containing gas;

(b) separating the lower boiling hydrocarbon liquid phase and the vapor phase; and (c) recycling at least a portion of the vapor phase of step to the hydrocracking zone.

In another preferred embodiment, the total cycle time for rapid cycle pressure swing adsorption is less than about 10 seconds and the pressure drop of each adsorbent bed is greater than about 10 inches of water per foot of bed length.

In yet another preferred embodiment, the total cycle time for rapid cycle pressure swing adsorption is less than about 5 seconds and the pressure drop of each adsorbent bed is greater than about 20 inches of water per foot of bed length.

DETAILED DESCRIPTION OF THE INVENTION

Figure 1:
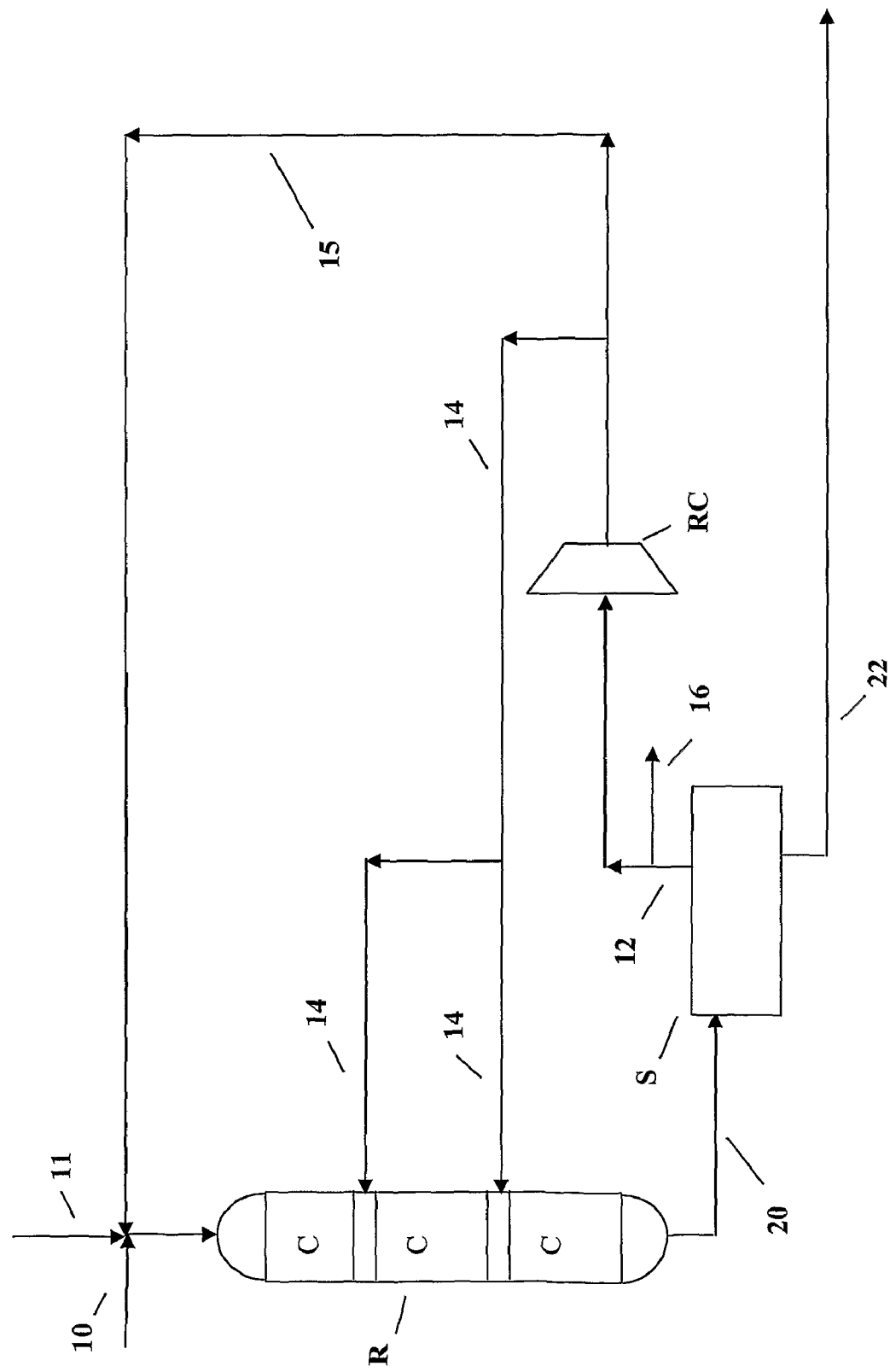
FIG. 1 hereof is a simplified schematic of a flow diagram of a hydrocracking unit of the prior art that does not employ rapid cycle pressure swing absorption.

The process of the present invention is particularly useful for hydrocracking a hydrocarbonaceous oil containing hydrocarbons and/or other organic materials to produce a product containing hydrocarbons and/or other organic materials of lower average boiling point and lower average molecular weight. The hydrocarbonaceous feedstocks that may be subjected to hydrocracking by the method of the present invention includes all mineral oils and synthetic oils (e.g., shale oil, tar sand products, etc.) and fractions thereof. Illustrative hydrocarbonaceous feedstocks include those containing components boiling above about 500° F. (260° C.), such as Fischer-Tropsch liquids, atmospheric gas oils, vacuum gas oils, deasphalted, vacuum, and atmospheric residua, hydrotreated or mildly hydrocracked residual oils, coker distillates, straight run distillates, solvent-deasphalted oils, pyrolysis-derived oils, high boiling synthetic oils, cycle oils and cat cracker distillates. A preferred hydrocracking feedstock is a gas oil or other hydrocarbon fraction having at least 50% by weight, and most usually at least 75% by weight, of its components boiling at temperatures above the end point of the desired product. One of the most preferred gas oil feedstocks will contain hydrocarbon components that boil above 500° F. (260° C.), with best results being achieved with feeds containing at least 25 percent by volume of the components boiling between about 600° F. (315° C.) and 1000° F. (538° C.). A preferred heavy feedstock boils in the range from about 350 to about 1050° F. (about 177° C. to about 565° C.).

Heavier linear paraffins and waxes such as Fischer Tropsch waxes, waxes from solvent dewaxing, slack waxes, and waxy crudes may also be upgraded to lighter products via hydrocracking processes. Hydrocracking catalysts and process conditions as utilized for distillates and heavy gas oils may be utilized in for hydrocracking of heavy linear paraffins and waxes.

The active metals employed in the preferred hydrocracking catalysts of the present invention as hydrogenation components are those of Group VIII of the Periodic Table of the Elements, i.e., iron, cobalt, nickel, ruthenium, rhodium, palladium, osmium, iridium and platinum. One or more promoter metals can also be present. Preferred promoter metals are those from Group VIB, e.g., molybdenum and tungsten, more preferably molybdenum. The amount of hydrogenation metal component in the catalyst can vary within wide ranges. Broadly speaking, any amount between about 0.05 percent and 30 percent by weight may be used. In the case of the noble metals, it is preferred to use about 0.05 to about 2 weight percent of such metals. The preferred method for incorporating the hydrogenation metal component is to contact a zeolite base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like if desired, and calcined in air at temperatures of, e.g., 700-1200° F. (371-648° C.) in order to activate the catalyst and decompose ammonium ions. Alternatively, the zeolite component may first be pelleted, followed by the addition of the hydrogenating component and activation by calcining. The foregoing catalysts may be employed in undiluted form, or the powdered zeolite catalyst may be mixed and copelleted with other relatively less active catalysts, diluents or binders such as alumina, silica gel, silica-alumina cogels, activated clays and the like in proportions ranging between 5 and 90 weight percent. These diluents may be employed as such or they may contain a minor proportion of an added hydrogenating metal such as a Group VIB and/or Group VIII metal.

Additional metal promoted hydrocracking catalysts may also be utilized in the process of the present invention which comprises, for example, aluminophosphate molecular sieves, crystalline chromosilicates and other crystalline silicates. Often at least two catalysts are utilized for hydrotreating the feed to remove sulfur and nitrogen and to hydrocrack the feed into lighter products. Optionally a catalyst is employed to hydrotreat the product from the hydrocracking reaction (i.e., a post hydrotreating catalyst bed). Crystalline chromosilicates are more fully described in U.S. Pat. No. 4,363,718 to Klotz.

Hydrocracking is typically performed at a temperature from about 450° F. (232° C.) to about 875° F. (468° C.), at a pressure from about 500 psig (3.6 MPa) to about 3000 psig (20.8 MPa), at a liquid hourly space velocity (LHSV) from about 0.1 to about 30 $hr^{-1}$, and at a hydrogen circulation rate from about 2000 standard cubic feet per barrel (337 normal $m^3/m^3$) to about 25,000 standard cubic feet per barrel (4200 normal $m^3/m^3$). In accordance with the present invention, the term "substantial conversion to lower boiling products" is meant to connote the conversion of at least 5 volume percent of the fresh feedstock to lower boiling products. In a preferred embodiment, the per pass conversion in the hydrocracking zone is in the range from about 15% to about 45%. More preferably the per pass conversion is in the range from about 20% to about 40%. Herein, the term "hydrocarbon feed" is defined as a refinery, chemical or other industrial plant stream that is comprised of hydrocarbons including such streams wherein small levels (less than 5 wt %) of non-hydrocarbon contaminants such as, but not limited to, sulfur, water, ammonia, and metals may be present in the hydrocarbon feed.

One specialized form of hydrocracking is shape selective hydrocracking. In addition to molecular weight reduction and heteroatom removal, shape selective hydrocracking may also be utilized to reduce the pour point of a distillate or a lubricating oil basestock. Distillate and lubricating oil basestock shape selective hydrocracking is typically carried out by utilizing a medium pore sized, shape selective zeolite such as ZSM-5. In this process, linear and slightly branched paraffins in the feed are hydrocracked to lighter components, while the more branched paraffins in the feed are not converted. In addition, a hydrodesulfurization catalyst is included in the hydroprocessing reactor, which reduces the sulfur and nitrogen content of the feed.

As an example, distillate dewaxing via shape selective hydrocracking processes are typically carried out at 260 to 455 C, 20 to 50 kg/cm2 hydrogen partial pressure, 1 to 2.5 LHSV, and 250 to 425 Nm3/m3 hydrogen circulation rate. In shape selective distillate dewaxing, a lower sulfur, lower pour point distillate product, and a low sulfur motor gasoline are obtained. Typically, the distillate yield is over 85%, with 5-12% motor gasoline yield, the remainder being light gases. In shape selective lube dewaxing, a lower sulfur, lower pour point lube basestock or product is produced with an improved viscosity index. Lube dewaxing via shape selective hydrocracking processes are typically carried out at 500 to 750 F, 400 to 2000 psi, 1500 to 4000 scf/bbl, and 0.2 to 2 LHSV.

FIG. 1 hereof is a simplified representation of a flow diagram of a conventional hydrocracking process unit that does not employ a rapid cycle pressure swing adsorption unit. The hydrocarbon feed 10 to be hydrocracked is introduced to the hydrocracking reactor R along with a hydrogen-containing recycle treat gas 15 and hydrogen-containing make-up gas 11. The feed and hydrogen-containing gas streams flow concurrently through the hydrocracker reactor R through a plurality of beds C of suitable hydrocracking catalysts. The product effluent exits the hydrocracking reactor R and is sent via line 20 to a separator S where a liquid product fraction having a lower initial boiling point than the feed is recovered via line 22. This liquid product fraction is normally sent to additional processing equipment or processing units for further refinement. A hydrogen-containing vapor fraction 12 exits the separator S and is conducted to recycle compressor RC where at least a portion of the stream is recompressed and returned to the hydrocracking reactor R. A purge stream 16 may be taken off if to eliminate a portion of built up light hydrocarbons or other stream contaminants to avoid a build-up of these components in the system. The term "light hydrocarbons" used herein means a hydrocarbon mixture comprised of hydrocarbon compounds of about 1 to about 5 carbon atoms in weight (i.e., $C_1$ to $C_5$ weight hydrocarbon compounds).

Returning to FIG. 1, a portion of the compressed hydrogen-containing vapor fraction is recycled to reactor R as hydrogen-containing recycle gas 15 and a portion is conducted to the hydrocracking reactor R as quench gas 14. Since the reaction in a hydrocracking reactor is exothermic, the quench gas 14 is typically introduced in multiple locations between the hydrocracking reactor's catalyst beds to prevent reactor run away (overheating). Although various types of quench gases can be used, it is preferred that the quench gas be a hydrogen-containing stream from the separator S.

Figure 2:
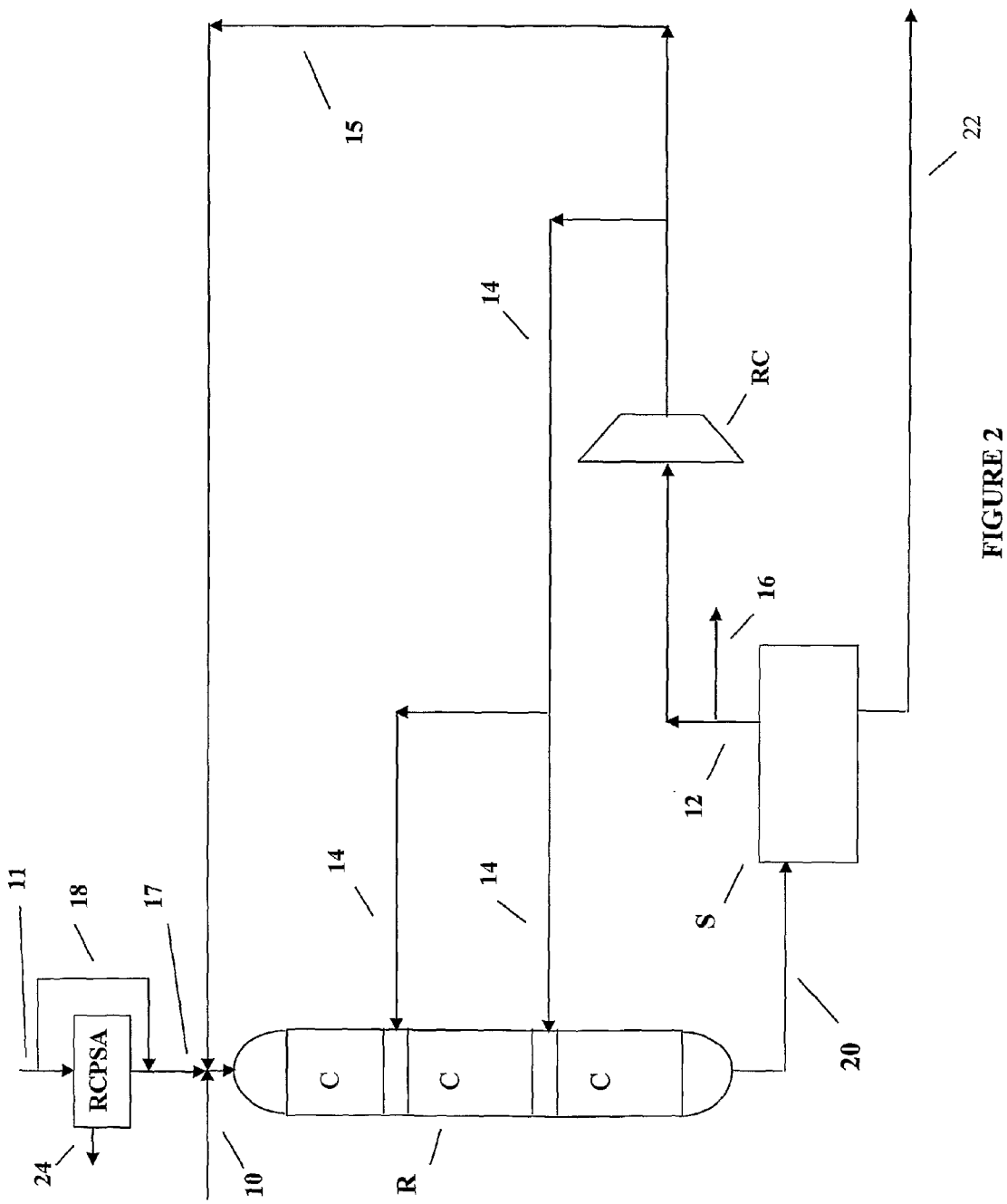
FIG. 2 hereof is a simplified schematic illustrating one embodiment employing rapid cycle pressure swing absorption in the hydrogen-containing make-up gas stream to a hydrocracking reactor.

FIG. 2 hereof represents a preferred embodiment of the process of the present invention wherein a rapid cycle pressure swing adsorption (RCPSA) unit is used to increase the concentration of hydrogen in the hydrogen-containing make-up gas 11 to hydrocracking reactor R. All numbered items are identical to that of FIG. 1 hereof except in the current embodiment as shown in FIG. 2, the hydrogen-containing make-up gas 11 is sent to a rapid cycle pressure swing adsorption unit RCPSA wherein light hydrocarbons and other gaseous impurities are removed as a tail gas 24. Depending on the specific RCPSA design, other contaminants, such as, but not limited to $CO_2$, water, ammonia, and $H_2S$ may also be removed from the hydrogen-containing make-up gas. The purified make-up gas stream 17 leaves the RCPSA unit having a higher concentration of hydrogen than the hydrogen-containing make-up gas stream 11 entering the RCPSA unit. The purified make-up gas stream 17 is conducted to the reactor and flows concurrent with the hydrocarbon feed 10 and hydrogen-containing recycle gas 15. A portion of the hydrogen-containing make-up gas 11 may bypass the RCPSA unit via line 18 if desired.

Figure 3:
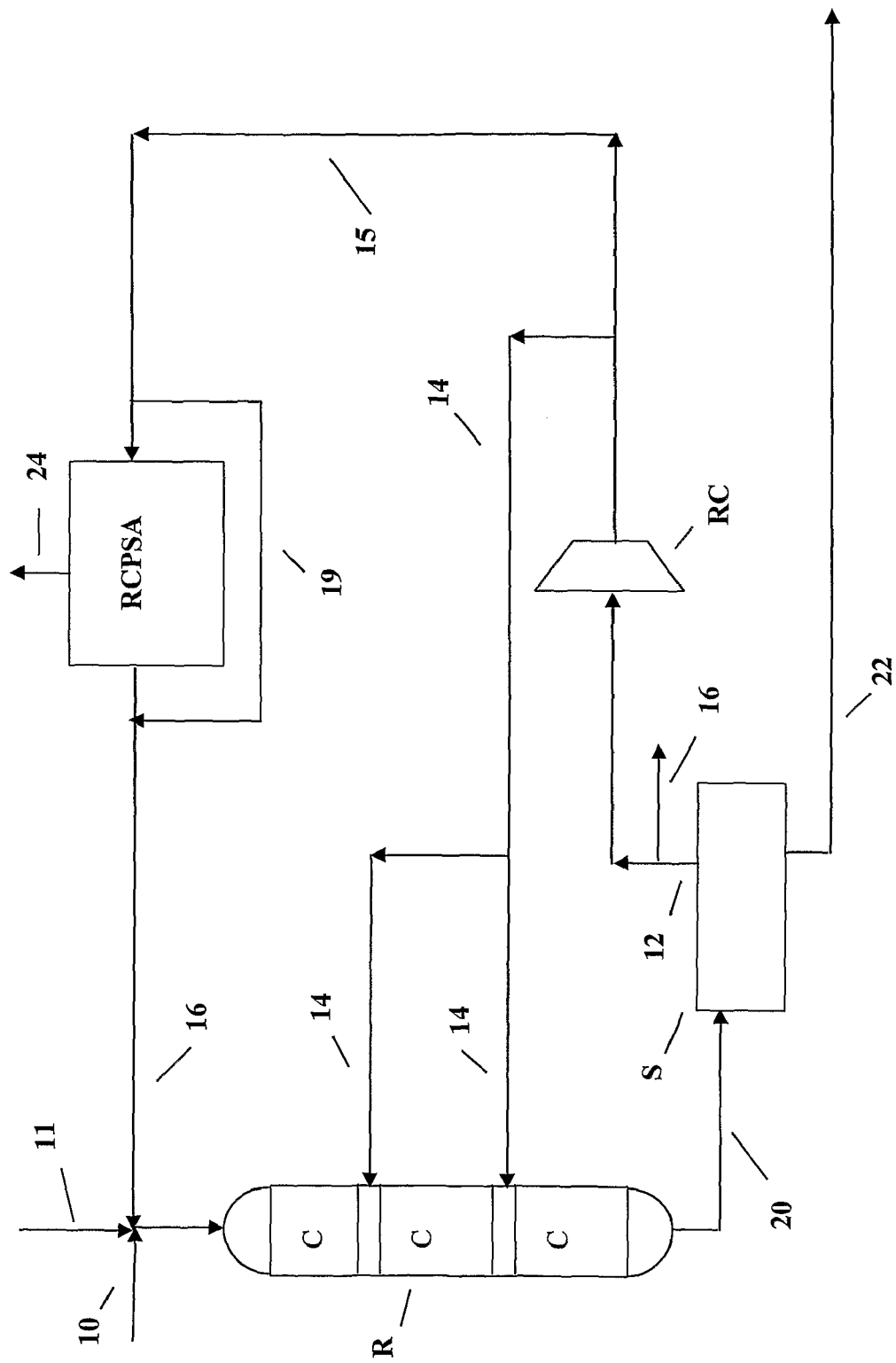
FIG. 3 hereof is a simplified schematic illustrating one embodiment employing rapid cycle pressure swing absorption in the hydrogen-containing recycle gas stream to a hydrocracking reactor.

FIG. 3 hereof represents a preferred embodiment of the process of the present invention wherein a rapid cycle pressure swing adsorption (RCPSA) unit is used to increase the concentration of hydrogen in the hydrogen-containing recycle gas 15 to hydrocracking reactor R. All numbered items are identical to that of FIG. 1 hereof except in the current embodiment as shown in FIG. 3, the hydrogen-containing recycle gas 15 is sent to a rapid cycle pressure swing adsorption unit RCPSA wherein light hydrocarbons and other gaseous impurities are removed as a tail gas 24. Depending on the specific RCPSA design, other contaminants, such as, but not limited to $CO_2$, water, and ammonia may also be removed from the hydrogen-containing make-up gas. The purified recycle gas stream 16 leaves the RCPSA unit having a higher concentration of hydrogen than the hydrogen-containing recycle gas stream 15 entering the RCPSA unit. The purified recycle gas stream 16 is conducted to the reactor and flows concurrent with the hydrocarbon feed 10 and hydrogen-containing make-up gas 11. A portion of the hydrogen-containing recycle gas stream 15 may bypass the RCPSA unit via line 19 if desired.

In another embodiment, two RCPSA units are installed in a single hydrocracking unit wherein a RCPSA unit is installed to purify the incoming hydrogen-containing make-up gas to the hydrocracking reactor as shown as RSPCA in FIG. 2 and a RCPSA unit is installed to purify at least a portion of the hydrogen-containing recycle gas stream of the hydrocracking reactor as shown as RSPCA in FIG. 3. In yet another embodiment, RCPSA may be applied to a two stage hydrocracking unit. In this embodiment an RCPSA unit may be installed in the hydrogen-containing make-up gas stream to the first stage hydrocracking reactor, the hydrogen-containing make-up gas stream to the second stage hydrocracking reactor, the hydrogen-containing recycle gas to the first stage hydrocracking reactor, or the hydrogen-containing recycle gas to the second stage hydrocracking reactor. In other embodiments, any combination of these four streams may be subjected to the RCPSA process depending upon the stream purity and hydrogen concentration needs and economics.

In Conventional Pressure Swing Adsorption ("conventional PSA") a gaseous mixture is conducted under pressure for a period of time over a first bed of a solid sorbent that is selective or relatively selective for one or more components, usually regarded as a contaminant that is to be removed from the gas stream. It is possible to remove two or more contaminants simultaneously but for convenience, the component or components that are to be removed will be referred to in the singular and referred to as a contaminant. The gaseous mixture is passed over a first adsorption bed in a first vessel and emerges from the bed depleted in the contaminant that remains sorbed in the bed. After a predetermined time or, alternatively when a break-through of the contaminant is observed, the flow of the gaseous mixture is switched to a second adsorption bed in a second vessel for the purification to continue. While the second bed is in adsorption service, the sorbed contaminant is removed from the first adsorption bed by a reduction in pressure, usually accompanied by a reverse flow of gas to desorb the contaminant. As the pressure in the vessels is reduced, the contaminant previously adsorbed on the bed is progressively desorbed into the tail gas system that typically comprises a large tail gas drum, together with a control system designed to minimize pressure fluctuations to downstream systems. The contaminant can be collected from the tail gas system in any suitable manner and processed further or disposed of as appropriate. When desorption is complete, the sorbent bed may be purged with an inert gas stream, e.g., nitrogen or a purified stream of the process gas. Purging may be facilitated by the use of a higher temperature purge gas stream.

After, e.g., breakthrough in the second bed, and after the first bed has been regenerated so that it is again prepared for adsorption service, the flow of the gaseous mixture is switched from the second bed to the first bed, and the second bed is regenerated. The total cycle time is the length of time from when the gaseous mixture is first conducted to the first bed in a first cycle to the time when the gaseous mixture is first conducted to the first bed in the immediately succeeding cycle, i.e., after a single regeneration of the first bed. The use of third, fourth, fifth, etc. vessels in addition to the second vessel, as might be needed when adsorption time is short but desorption time is long, will serve to increase cycle time.

Thus, in one configuration, a pressure swing cycle will include a feed step, at least one depressurization step, a purge step, and finally a repressurization step to prepare the adsorbent material for reintroduction of the feed step. The sorption of the contaminants usually takes place by physical sorption onto the sorbent that is normally a porous solid such as activated carbon, alumina, silica or silica-alumina that has an affinity for the contaminant. Zeolites are often used in many applications since they may exhibit a significant degree of selectivity for certain contaminants by reason of their controlled and predictable pore sizes. Normally, chemical reaction with the sorbent is not favored in view of the increased difficulty of achieving desorption of species which have become chemically bound to the sorbent, but chemisorption is my no means to be excluded if the sorbed materials may be effectively desorbed during the desorption portion of the cycle, e.g., by the use of higher temperatures coupled with the reduction in pressure. Pressure swing adsorption processing is described more fully in the book entitled *Pressure Swing Adsorption*, by D. M. Ruthven, S. Farouq & K. S. Knaebel (VCH Publishers, 1994).

Conventional PSA possesses significant inherent disadvantages for a variety of reasons. For example, conventional PSA units are costly to build and operate and are significantly larger in size for the same amount of hydrogen that needs to be recovered from hydrogen-containing gas streams as compared to RCPSA. Also, a conventional pressure swing adsorption unit will generally have cycle times in excess of one minute, typically in excess of 2 to 4 minutes due to time limitations required to allow diffusion of the components through the larger beds utilized in conventional PSA and the equipment configuration and valving involved. In contrast, rapid cycle pressure swing adsorption is utilized which has total cycle times of less than one minute. The total cycle times of RCPSA may be less than 30 seconds, preferably less than 15 seconds, more preferably less than 10 seconds, even more preferably less than 5 seconds, and even more preferably less 2 seconds. Further, the rapid cycle pressure swing adsorption units used can make use of substantially different sorbents, such as, but not limited to, structured materials such as monoliths.

The overall adsorption rate of the adsorption processes, whether conventional PSA or RCPSA, is characterized by the mass transfer rate constant in the gas phase ($\tau_g$) and the mass transfer rate constant in the solid phase ($\tau_s$). A material's mass transfer rates of a material are dependent upon the adsorbent, the adsorbed compound, the pressure and the temperature. The mass transfer rate constant in the gas phase is defined as:

$$\tau_g = D_g/R_g^2 \text{ (in cm}^2\text{/sec)} \tag{1}$$

where $D_g$ is the diffusion coefficient in the gas phase and $R_g$ is the characteristic dimension of the gas medium. Here the gas diffusion in the gas phase, $D_g$, is well known in the art (i.e., the conventional value can be used) and the characteristic dimension of the gas medium, $R_g$ is defined as the channel width between two layers of the structured adsorbent material.

The mass transfer rate constant in the solid phase of a material is defined as:

$$\tau_s = D_s/R_s^2 \text{ (in cm}^2\text{/sec)} \tag{2}$$

where $D_s$ is the diffusion coefficient in the solid phase and $R_s$ is the characteristic dimension of the solid medium. Here the gas diffusion coefficient in the solid phase, $D_s$, is well known in the art (i.e., the conventional value can be used) and the characteristic dimension of the solid medium, $R_s$ is defined as the width of the adsorbent layer.

D. M. Ruthven & C. Thaeron, *Performance of a Parallel Passage Absorbent Contactor*, Separation and Purification Technology 12 (1997) 43-60, which is incorporated by reference, clarifies that for flow through a monolith or a structured adsorbent that channel width is a good characteristic dimension for the gas medium, $R_g$. U.S. Pat. No. 6,607,584 to Moreau et al., which is incorporated by reference, also describes the details for calculating these transfer rates and associated coefficients for a given adsorbent and the test standard compositions used for conventional PSA. Calculation of these mass transfer rate constants is well known to one of ordinary skill in the art and may also be derived by one of ordinary skill in the art from standard testing data.

Conventional PSA relies on the use of adsorbent beds of particulate adsorbents. Additionally, due to construction constraints, conventional PSA is usually comprised of 2 or more separate beds that cycle so that at least one or more beds is fully or at least partially in the feed portion of the cycle at any one time in order to limit disruptions or surges in the treated process flow. However, due to the relatively large size of conventional PSA equipment, the particle size of the adsorbent material is general limited particle sizes of about 1 mm and above. Otherwise, excessive pressure drop, increased cycle times, limited desorption, and channeling of feed materials will result.

In an embodiment, RCPSA utilizes a rotary valving system to conduct the gas flow through a rotary sorber module that contains a number of separate adsorbent bed compartments or "tubes", each of which is successively cycled through the sorption and desorption steps as the rotary module completes the cycle of operations. The rotary sorber module is normally comprised of multiple tubes held between two seal plates on either end of the rotary sorber module wherein the seal plates are in contact with a stator comprised of separate manifolds wherein the inlet gas is conducted to the RCPSA tubes and processed purified product gas and the tail gas exiting the RCPSA tubes is conducted away from rotary sorber module. By suitable arrangement of the seal plates and manifolds, a number of individual compartments or tubes may pass through the characteristic steps of the complete cycle at any one time. In contrast with conventional PSA, the flow and pressure variations required for the RCPSA sorption/desorption cycle changes in a number of separate increments on the order of seconds per cycle, which smoothes out the pressure and flow rate pulsations encountered by the compression and valving machinery. In this form, the RCPSA module includes valving elements angularly spaced around the circular path taken by the rotating sorption module so that each compartment is successively passed to a gas flow path in the appropriate direction and pressure to achieve one of the incremental pressure/flow direction steps in the complete RCPSA cycle. One key advantage of the RCPSA technology is a significantly more efficient use of the adsorbent material. The quantity of adsorbent required with RCPSA technology can be only a fraction of that required for conventional PSA technology to achieve the same separation quantities and qualities. As a result, the footprint, investment, and the amount of active adsorbent required for RCPSA is significantly lower than that for a conventional PSA unit processing an equivalent amount of gas.

In an embodiment, RCPSA bed length unit pressure drops, required adsorption activities, and mechanical constraints (due to centrifugal acceleration of the rotating beds in RCPSA), prevent the use of many conventional PSA adsorbent bed materials, in particular adsorbents that are in a loose pelletized, particulate, beaded, or extrudate form. In a preferred embodiment, adsorbent materials are secured to a supporting understructure material for use in an RCPSA rotating apparatus. For example, one embodiment of the rotary RCPSA apparatus can be in the form of adsorbent sheets comprising adsorbent material coupled to a structured reinforcement material. A suitable binder may be used to attach the adsorbent material to the reinforcement material. Non-limiting examples of reinforcement material include monoliths, a mineral fiber matrix, (such as a glass fiber matrix), a metal wire matrix (such as a wire mesh screen), or a metal foil (such as aluminum foil), which can be anodized. Examples of glass fiber matrices include woven and non-woven glass fiber scrims. The adsorbent sheets can be made by coating a slurry of suitable adsorbent component, such as zeolite crystals with binder constituents onto the reinforcement material, non-woven fiber glass scrims, woven metal fabrics, and expanded aluminum foils. In a particular embodiment, adsorbent sheets or material are coated onto ceramic supports.

An absorber in a RCPSA unit typically comprises an adsorbent solid phase formed from one or more adsorbent materials and a permeable gas phase through which the gases to be separated flow from the inlet to the outlet of the adsorber, with a substantial portion of the components desired to be removed from the stream adsorbing onto the solid phase of the adsorbent. This gas phase may be called "circulating gas phase", but more simply "gas phase". The solid phase includes a network of pores, the mean size of which is usually between approximately 0.02 μm and 20 μm. There may be a network of even smaller pores, called "micropores", this being encountered, for example, in microporous carbon adsorbents or zeolites. The solid phase may be deposited on a non-adsorbent support, the primary function of which is to provide mechanical strength for the active adsorbent materials and/or provide a thermal conduction function or to store heat. The phenomenon of adsorption comprises two main steps, namely passage of the adsorbate from the circulating gas phase onto the surface of the solid phase, followed by passage of the adsorbate from the surface to the volume of the solid phase into the adsorption sites.

In an embodiment, RCPSA utilizes a structured adsorbent which is incorporated into the tubes utilized in the RSPCA apparatus. These structured adsorbents have an unexpectedly high mass transfer rate since the gas flows through the channels formed by the structured sheets of the adsorbent which offers a significant improvement in mass transfer as compared to a traditional packed fixed bed arrangement as utilized in conventional PSA. The ratio of the transfer rate of the gas phase ($\tau_g$) and the mass transfer rate of the solid phase ($\tau_s$) in the current invention is greater than 10, preferably greater than 25, more preferably greater than 50. These extraordinarily high mass transfer rate ratios allow RCPSA to produce high purity hydrogen streams at high recovery rates with only a fraction of the equipment size, adsorbent volume, and cost of conventional PSA.

The structured adsorbent embodiments also results in significantly greater pressure drops to be achieved through the adsorbent than conventional PSA without the detrimental effects associated with particulate bed technology. The adsorbent beds can be designed with adsorbent bed unit length pressure drops of greater than 5 inches of water per foot of bed length, more preferably greater than 10 in. $H_2O$/ft, and even more preferably greater than 20 in. $H_2O$/ft. This is in contrast with conventional PSA units where the adsorbent bed unit length pressure drops are generally limited to below about 5 in. $H_2O$/ft depending upon the adsorbent used, with most conventional PSA units being designed with a pressure drop of about 1 in. $H_2O$/ft or less to minimize the problems discussed that are associated with the larger beds, long cycle time, and particulate absorbents of conventional PSA units. The adsorbent beds of conventional PSA cannot accommodate higher pressure drops because of the risk of fluidizing the beds which results in excessive attrition and premature unit shutdowns due to accompanying equipment problems and/or a need to add or replace lost adsorbent materials. These markedly higher adsorbent bed unit length pressure drops allow RCPSA adsorbent beds to be significantly more compact, shorter, and efficient than those utilized in conventional PSA.

In an embodiment, high unit length pressure drops allow high vapor velocities to be achieved across the structured adsorbent beds. This results in a greater mass contact rate between the process fluids and the adsorbent materials in a unit of time than can be achieved by conventional PSA. This results in shorter bed lengths, higher gas phase transfer rates ($\tau_g$) and improved hydrogen recovery. With these significantly shorter bed lengths, total pressure drops of the RSCPA application of the present invention can be maintained at total bed pressure differentials during the feed cycle of about 0.5 to 50 psig, preferably less than 30 psig, while minimizing the length of the active beds to normally less than 5 feet in length, preferably less than 2 feet in length and as short as less than 1 foot in length.

The absolute pressure levels employed during the RCPSA process are not critical. In practice, provided that the pressure differential between the adsorption and desorption steps is sufficient to cause a change in the adsorbate fraction loading on the adsorbent thereby providing a delta loading effective for separating the stream components processed by the RCPSA unit. Typical absolute operating pressure levels range from about 50 to 2500 psia. However, it should be noted that the actual pressures utilized during the feed, depressurization, purge and repressurization stages are highly dependent upon many factors including, but not limited to, the actual operating pressure and temperature of the overall stream to be separated, stream composition, and desired recovery percentage and purity of the RCPSA product stream. The RCPSA process is not specifically limited to any absolute pressure and due to its compact size becomes incrementally more economical than conventional PSA processes at the higher operating pressures. U.S. Pat. Nos. 6,406,523; 6,451,095; 6,488, 747; 6,533,846 and 6,565,635, all of which are incorporated herein by reference, disclose various aspects of RCPSA technology.

In an embodiment and an example, the rapid cycle pressure swing adsorption system has a total cycle time, $t_{TOT}$, to separate a feed gas into product gas (in this case, a hydrogen-enriched stream) and a tail (exhaust) gas. The method generally includes the steps of conducting the feed gas having a hydrogen purity F %, where F is the percentage of the feed gas which is the weakly-adsorbable (hydrogen) component, into an adsorbent bed that selectively adsorbs the tail gas and passes the hydrogen product gas out of the bed, for time, $t_F$, wherein the hydrogen product gas has a purity of P % and a rate of recovery of R %. Recovery R % is the ratio of amount of hydrogen retained in the product to the amount of hydrogen available in the feed. Then the bed is co-currently depressurized for a time, $t_{CO}$, followed by counter-currently depressurizing the bed for a time, $t_{CN}$, wherein desorbate (tail gas or exhaust gas) is released from the bed at a pressure greater than or equal to 1 psig. The bed is purged for a time, $t_P$, typically with a portion of the hydrogen product gas. Subsequently the bed is repressurized for a time, $t_{RP}$, typically with a portion of hydrogen product gas or feed gas, wherein the cycle time, $t_{TOT}$, is equal to the sum of the individual cycle times comprising the total cycle time, i.e.:

$$t_{TOT} = t_F + t_{CO} + t_{CN} + t_P + t_{RP} \quad (3)$$

This embodiment encompasses, but is not limited to, RCPSA processes such that either the rate of recovery, R %>80% for a product purity to feed purity ratio, P %/F %>1.1, and/or the rate of recovery, R %>90% for a product purity to feed purity ratio, 0<P %/F %<1.1. Results supporting these high recovery & purity ranges can be found in Examples 4 through 10 herein. Other embodiments will include applications of RCPSA in processes where hydrogen recovery rates are significantly lower than 80%. Embodiments of RCPSA are not limited to exceeding any specific recovery rate or purity thresholds and can be as applied at recovery rates and/or purities as low as desired or economically justifiable for a particular application.

It should also be noted that it is within the scope of this invention that steps $t_{CO}$, $t_{CN}$, or $t_P$ of equation (3) above can be omitted together or in any individual combination. However it is preferred that all steps in the above equation (3) be performed or that only one of steps $t_{CO}$ or $t_{CN}$ be omitted from the total cycle. However, additional steps can also be added within a RCPSA cycle to aid in enhancing purity and recovery of hydrogen. Thus enhancement could be practically achieved in RCPSA because of the small portion of absorbent needed and due to the elimination of a large number of stationary valves utilized in conventional PSA applications.

In an embodiment, the tail gas is also preferably released at a pressure high enough so that the tail gas may be fed to another device absent tail gas compression. More preferably the tail gas pressure is greater than or equal to 60 psig. In a most preferred embodiment, the tail gas pressure is greater than or equal to 80 psig. At higher pressures, the tail gas can be conducted to a fuel header.

Practice of the present invention can have the following benefits:

(a) Increasing the purity of hydrogen-containing stream(s) available as make-up gas, or of streams which must be upgraded to higher purity before they are suitable as make-up gas.

(b) Increasing the purity of hydrogen-containing recycle gas streams resulting in an increase in overall hydrogen treat gas purity in the hydrocracking reactor recycle and quench gas streams to allow for improved hydrocracking severity or additional product treating.

(c) Use for $H_2$ recovery from hydroprocessing purge gases, either where significant concentrations of $H_2S$ are present (before gas scrubbing) or after gas scrubbing (typically <100 vppm $H_2S$).

In hydrocracking processes, increased $H_2$ purity translates to higher $H_2$ partial pressures in the hydrocracking reactor(s). This both increases the reaction kinetics and decreases the rate of catalyst deactivation. The benefits of higher $H_2$ partial pressures can be exploited in a variety of ways, such as:

operating at lower reactor temperature, which reduces energy costs, decreases catalyst deactivation, and extends catalyst life; increasing unit feed rate; processing more sour (higher sulfur) feedstocks; processing higher concentrations of heavier feedstocks; improved product color, particularly near end of run; debottlenecking existing compressors and/or treat gas circuits (increased scf $H_2$ at constant total flow, or same scf $H_2$ at lower total flow); and other means that would be apparent to one skilled in the art.

Increased $H_2$ recovery also offers significant potential benefits, some of which are described as follows:

(i) reducing the demand for purchased, manufactured, or other sources of $H_2$ within the refinery;

(ii) increasing hydrocracking feed rates at constant (existing) makeup gas demands as a result of the increased hydrogen recovery;

(iii) improving the hydrogen purity in hydrocracking reactions for increased heteroatom removal efficiencies;

(iv) removing a portion of the $H_2$ from refinery fuel gas which is detrimental to the fuel gas due to hydrogen's low BTU value which can present combustion capacity limitations and difficulties for some furnace burners;

(v) Other benefits that would be apparent to one knowledgeable in the art.

The following examples are presented for illustrative purposes only and should not be cited as being limiting in any way.

EXAMPLES

Example 1

This example illustrates the conventional or prior art. A hydrocracker unit is fed with hydrogen streams from different sources i.e. 16.2 MSCFD @97% hydrogen purity from a membrane unit, 11.4 MSCFD @95% H2 purity from hydrogen plant and 7.2 MSCFD 95% $H_2$ purity from a cryogenic unit. Based on the capacity of the hydrocracker a purge stream of 1.2 MSCFD is removed to avoid build up of hydrocarbons in the loop before the combined feed (total 33.6 MSCFD @95.9% $H_2$ purity) is directed to the hydrocracker. In the hydrocracker, 28.9 MSCFD is consumed and a recycle stream of 4.2 MSCFD @80% $H_2$ is created.

Example 2

This example illustrates one embodiment of the invention. A hydrocracker unit is fed with hydrogen streams from different sources. One source is a membrane unit supplying 14.5 MSCFD @97% hydrogen purity. In the embodiment of the present invention, the hydrogen from the cryogenic and hydrogen plant streams cited in Example 1 are supplied first to an RCPSA unit. The product from the RCPSA unit comprising 19.1 MSCFD @99% $H_2$ purity is blended with the hydrogen from the membrane unit and supplied (33.6 MSCFD @98.1 $H_2$ purity). This higher purity hydrogen stream enabled by the use of the RCPSA upstream of the hydrocracker permits enhanced operation of the hydrocracker, consuming 31.3 MSCFD (vs. 28.9 MSCFD for the base operation). This unexpected enhanced operation of hydrocracker results in producing more products (e.g., gasoline) from the heavier feedstocks.

Example 3

In this example, the refinery stream is at 480 psig with tail gas at 65 psig whereby the pressure swing is 6.18. The feed composition and pressures are typical of refinery processing units such as those found in hydroprocessing or hydrotreating applications. In this example typical hydrocarbons are described by their carbon number i.e. $C_1$=methane, $C_2$=ethane etc. The RCPSA is capable of producing hydrogen at >99% purity and >81% recovery over a range of flow rates. Tables 1a and 1b show the results of computer simulation of the RCPSA and the input and output percentages of the different components for this example. Tables 1a and 1b also show how the hydrogen purity decreases as recovery is increased from 89.7% to 91.7% for a 6 MMSCFD stream at 480 psig and tail gas at 65 psig.

Tables 1a & 1b

Composition (mol %) of Input and Output from RCPSA (67 ft$^3$) in H2 Purification Feed is at 480 psig, 122 deg F. and Tail Gas at 65 psig Feed Rate is About 6 MMSCFD TABLE 1a Higher purity
Step Times in seconds are $t_F = 1$, $t_{CO} = 0.167$, $t_{CN} = 0$, $t_P = 0.333$, $t_{RP} = 0.5$

| | feed | product | Tail-Gas |
|---|---|---|---|
| H2 | 88.0 | 98.69 | 45.8. |
| C1 | 6.3 | 1.28 | 25.1 |
| C2 | 0.2 | 0.01 | 1.0 |
| C3 | 2.6 | 0.01 | 12.3 |
| C4+ | 2.9 | 0.00 | 14.8 |
| H2O | 2000 vppm | 65 vppm | 9965 vppm |
| total (MMSCFD) | 6.162 | 4.934 | 1.228 |
| | 480 psig | 470 psig | 65 psig |

H2 at 98.6% purity, 89.7% recovery

TABLE 1b

Higher purity
Step times in seconds are $t_F = 1$, $t_{CO} = 0.333$, $t_{CN} = 0$, $t_P = 0.167$, $t_{RP} = 0.5$

| | feed | product | Tail-Gas |
|---|---|---|---|
| H2 | 88.0 | 97.80 | 45.9 |
| C1 | 6.3 | 2.14 | 25.0 |
| C2 | 0.2 | 0.02 | 1.0 |
| C3 | 2.6 | 0.02 | 12.3 |
| C4+ | 2.9 | 0.00 | 14.9 |
| H2O | 2000 vppm | 131 vppm | 10016 vpm |
| total (MMSCFD) | 6.160 | 5.085 | 1.074 |
| | 480 psig | 470 psig | 65 psig |

H2 at 97.8% purity, 91.7% recovery

The RCPSA's described in the present invention operate a cycle consisting of different steps. Step 1 is feed during which product is produced, step 2 is co-current depressurization, step 3 is counter-current depressurization, step 4 is purge, usually counter-current) and step 5 is repressurization with product. In the RCPSA's described here at any instant half the total number of beds are on the feed step. In this example, $t_{TOT}=2$ sec in which the feed time, $t_F$, is one-half of the total cycle.

Example 4

In this example, the conditions are the same as in Example 3. Table 2a shows conditions utilizing both a co-current and counter-current steps to achieve hydrogen purity >99%. Table 2b shows that the counter-current depressurization step may be eliminated, and a hydrogen purity of 99% can still be maintained. In fact, this shows that by increasing the time of the purge cycle, $t_P$, by the duration removed from the countercurrent depressurization step, $t_{CN}$, that hydrogen recovery can be increased to a level of 88%.

Tables 2a & 2b

Effect of Step Durations on H2 Purity and Recovery from an RCPSA (67 ft$^3$)

Same Conditions as Table 1. Feed is at 480 psig, 122 deg F. and Tail Gas at 65 psig. Feed Rate is About 6 MMSCFD TABLE 2a With counter-current depress, Intermediate pressure = 105 psig

| purity % | recovery % | $t_F$ s | $t_{CO}$ s | $t_{CN}$ s | $t_P$ s | $t_{RP}$ s |
|---|---|---|---|---|---|---|
| 98.2 | 84.3 | 1 | 0.283 | 0.05 | 0.167 | 0.5 |
| 98.3 | 85 | 1 | 0.166 | 0.167 | 0.167 | 0.5 |
| 99.9 | 80 | 1 | 0.083 | 0.25 | 0.167 | 0.5 |

TABLE 2b

Without counter-current depress

| purity % | recovery % | $t_F$ s | $t_{CO}$ s | $t_{CN}$ s | $t_P$ s | $t_{RP}$ s |
|---|---|---|---|---|---|---|
| 97.8 | 91.7 | 1 | 0.333 | 0 | 0.167 | 0.5 |
| 98.7 | 90 | 1 | 0.166 | 0 | 0.334 | 0.5 |
| 99 | 88 | 1 | 0.083 | 0 | 0.417 | 0.5 |

Example 5

This example shows a 10 MMSCFD refinery stream, once again containing typical components, as shown in feed column of Table 3 (e.g. the feed composition contains 74% H$_2$). The stream is at 480 psig with RCPSA tail gas at 65 psig whereby the absolute pressure swing is 6.18. Once again the RCPSA of the present invention is capable of producing hydrogen at >99% purity and >85% recovery from these feed compositions. Tables 3a and 3b show the results of this example.

Tables 3a & 3b

Composition (mol %) of Input and Output from RCPSA (53 ft$^3$) in H2 Purification. Feed is at 480 psig, 101 deg F. and Tail Gas at 65 psig Feed rate is about 10 MMSCFD TABLE 3a Higher purity
Step Times in seconds are $t_F$ = 0.583, $t_{CO}$ = 0.083, $t_{CN}$ = 0, $t_P$ = 0.25, $t_{RP}$ = 0.25

| | feed | product | Tail-Gas |
|---|---|---|---|
| H2 | 74.0 | 99.98 | 29.8 |
| C1 | 14.3 | 0.02 | 37.6 |
| C2 | 5.2 | 0.00 | 13.8 |
| C3 | 2.6 | 0.00 | 7.4 |
| C4+ | 3.9 | 0.00 | 11.0 |

TABLE 3a-continued

Higher purity
Step Times in seconds are $t_F$ = 0.583, $t_{CO}$ = 0.083, $t_{CN}$ = 0, $t_P$ = 0.25, $t_{RP}$ = 0.25

| | feed | product | Tail-Gas |
|---|---|---|---|
| H2O | 2000 vppm | 0.3 vppm | 5387 vppm |
| total (MMSCFD) | 10.220 | 6.514 | 3.705 |
| | 480 psig | 470 psig | 65 psig |

H2 at 99.98% purity and 86% recovery

TABLE 3b

Lower purity
Step Times in seconds are $t_F$ = 0.5, $t_{CO}$ = 0.167, $t_{CN}$ = 0, $t_P$ = 0.083, $t_{RP}$ = 0.25

| | feed | product | Tail-Gas |
|---|---|---|---|
| H2 | 74.0 | 93.12 | 29.3 |
| C1 | 14.3 | 6.34 | 31.0 |
| C2 | 5.2 | 0.50 | 16.6 |
| C3 | 2.6 | 0.02 | 8.9 |
| C4+ | 3.9 | 0.00 | 13.4 |
| H2O | 2000 vppm | 142 vppm | 6501 vpm |
| total (MMSCFD) | 10.220 | 7.240 | 2.977 |
| | 480 psig | 470 psig | 65 psig |

H2 at 93% purity and 89% recovery

In both cases shown in Tables 3a and 3b above, although tail gas pressure is high at 65 psig, the present invention shows that high purity (99%) may be obtained if the purge step, $t_P$, is sufficiently increased.

Tables 2a, 2b and 3a show that for both 6 MMSCFD and 10 MMSCFD flow rate conditions, very high purity hydrogen at ~99% and >85% recovery is achievable with the RCPSA. In both cases the tail gas is at 65 psig. Such high purities and recoveries of product gas achieved using the RCPSA with all the exhaust produced at high pressure have not been discovered before and are a key feature of the present invention.

Table 3c shows the results for an RCPSA (volume=49 cubic ft) that delivers high purity (>99%) H$_2$ at high recovery for the same refinery stream discussed in Tables 3a and 3b. As compared to Table 3a, Table 3c shows that similar purity and recovery rates can be achieved by simultaneously decreasing the duration of the feed cycle, $t_F$, and the purge cycle, $t_P$.

TABLE 3c

Effect of step durations on H2 purity and recovery from an RCPSA (49 ft$^3$).

| purity % | recovery % | $t_F$ s | $t_{CO}$ s | $t_{CN}$ s | $t_P$ s | $t_{RP}$ s |
|---|---|---|---|---|---|---|
| 95.6 | 87.1 | 0.5 | 0.167 | 0 | 0.083 | 0.25 |
| 97.6 | 86 | 0.5 | 0.117 | 0 | 0.133 | 0.25 |
| 99.7 | 85.9 | 0.5 | 0.083 | 0 | 0.167 | 0.25 |

Feed is at 480 psig, 101 deg F. and Tail gas at 65 psig. Feed rate is about 10 MMSCFD.
Without counter-current depress Example 6

In this example, Table 4 further illustrates the performance of RCPSA's operated in accordance with the invention being described here. In this example, the feed is a typical refinery stream and is at a pressure of 300 psig. The RCPSA of the present invention is able to produce 99% pure hydrogen product at 83.6% recovery when all the tail gas is exhausted at 40 psig. In this case the tail gas can be sent to a flash drum or other separator or other downstream refinery equipment without further compression requirement. Another important aspect of this invention is that the RCPSA also removes CO to <2 vppm, which is extremely desirable for refinery units that use the product hydrogen enriched stream. Lower levels of CO ensure that the catalysts in the downstream units operate without deterioration in activity over extended lengths. Conventional PSA cannot meet this CO specification and simultaneously also meet the condition of exhausting all the tail gas at the higher pressure, such as at typical fuel header pressure or the high pressure of other equipment that processes such RCPSA exhaust. Since all the tail gas is available at 40 psig or greater, no additional compression is required for integrating the RCPSA with refinery equipment.

TABLE 4

Composition (mol %) of input and output from RCPSA (4 ft$^3$) in carbon monoxide and hydrocarbon removal from hydrogen.

|  | feed | product | Tail-Gas |
|---|---|---|---|
| H2 | 89.2 | 99.98 | 48.8 |
| C1 | 3.3 | 0.01 | 13.9 |
| C2 | 2.8 | 0.01 | 13.9 |
| C3 | 2.0 | 0.00 | 10.2 |
| C4+ | 2.6 | 0.00 | 13.2 |
| CO | 50 | 1.1 | 198.4 |
| total | 0.971 | 0.760 | 0.211 |
|  | 300 psig | 290 psig | 40 psig |

Feed is at 300 psig, 101 deg F., and Feed rate is about 0.97 MMSCFD.
Step Times in seconds are $t_F = 0.5$, $t_{CO} = 0.1$, $t_{CN} = 0$, $t_P = 0.033$, $t_{RP} = 0.066$
H2 at 99.99% purity and 88% recovery Example 7

Tables 5a and 5b compare the performance of RCPSA's operated in accordance with the invention being described here. The stream being purified has lower H$_2$ in the feed (51% mol) and is a typical refinery/petrochemical stream. In both cases (corresponding to Tables 5a and 5b), a counter current depressurization step is applied after the co-current step. In accordance with the invention, Table 5a shows that high H$_2$ recovery (81%) is possible even when all the tail gas is released at 65 psig or greater. In contrast, the RCPSA where some tail-gas is available as low as 5 psig, loses hydrogen in the counter-current depressurization such that H$_2$ recovery drops to 56%. In addition, the higher pressure of the stream in Table 5a indicates that no tail gas compression is required.

Tables 5a & 5b

Effect of Tail Gas Pressure on Recovery

Example of RCPSA Applied to a Feed with H2 Concentration (51.3 mol %)

Composition (mol %) of Input and Output from RCPSA (31 ft$^3$) in H2 Purification Feed is at 273 psig, 122 deg F. and Feed Rate is About 5.1 MMSCFD TABLE 5a Step Times in seconds are $t_F = 0.5$, $t_{CO} = 0.083$, $t_{CN} = 0.033$, $t_P = 0.25$, $t_{RP} = 0.133$

|  | feed | product | Tail-Gas |
|---|---|---|---|
| H2 | 51.3 | 99.71 | 20.1 |
| C1 | 38.0 | 0.29 | 61.0 |

TABLE 5a-continued

Step Times in seconds are $t_F = 0.5$, $t_{CO} = 0.083$, $t_{CN} = 0.033$, $t_P = 0.25$, $t_{RP} = 0.133$

|  | feed | product | Tail-Gas |
|---|---|---|---|
| C2 | 4.8 | 0.00 | 8.0 |
| C3 | 2.2 | 0.00 | 3.8 |
| C4+ | 3.7 | 0.00 | 6.4 |
| H2O | 4000 vppm | 0.7 vppm | 6643 vppm |
| total (MMSCFD) | 5.142 | 2.141 | 3.001 |
|  | 273 psig | 263 psig | 65-83 psig |

[a] Tail gas available from 65-83 psig, H2 at 99.7% purity and 81% recovery

TABLE 5b

Step Times in sec. are $t_F = 0.667$, $t_{CO} = 0.167$, $t_{CN} = 0.083$, $t_P = 0.083$, $t_{RP} = 0.33$

|  | feed | product | Tail-Gas |
|---|---|---|---|
| H2 | 51.3 | 99.99 | 34.2 |
| C1 | 38.0 | 0.01 | 48.8 |
| C2 | 4.8 | 0.00 | 6.9 |
| C3 | 2.2 | 0.00 | 3.4 |
| C4+ | 3.7 | 0.00 | 6.2 |
| H2O | 4000 vppm | 0.0 vppm | 5630 vppm |
| Total (MMSCFD) | 5.142 | 1.490 | 3.651 |
|  | 273 psig | 263 psig | 5-65 psig |

[b] Tail gas available from 5-65 psig, H2 at 99.9% purity and 56% recovery

Example 8

In this example, Tables 6a and 6b compare the performance of RCPSA's operated in accordance with the invention being described here. In these cases, the feed pressure is 800 psig and tail gas is exhausted at either 65 psig or at 100 psig. The composition reflects typical impurities such H2S, which can be present in such refinery applications. As can be seen, high recovery (>80%) is observed in both cases with the high purity >99%. In both these cases, only a co-current depressurization is used and the effluent during this step is sent to other beds in the cycle. Tail gas only issues during the countercurrent purge step. Table 6c shows the case for an RCPSA operated where some of the tail gas is also exhausted in a countercurrent depressurization step following a co-current depressurization. The effluent of the co-current depressurization is of sufficient purity and pressure to be able to return it one of the other beds in the RCPSA vessel configuration that is part of this invention. Tail gas i.e., exhaust gas, issues during the counter-current depressurization and the counter-current purge steps.

In all cases the entire amount of tail gas is available at elevated pressure which allows for integration with other high pressure refinery process. This removes the need for any form of required compression while producing high purity gas at high recoveries. In accordance with the broad claims of this invention, these cases are only to be considered as illustrative examples and not limiting either to the refinery, petrochemical or processing location or even to the nature of the particular molecules being separated.

Tables 6a, 6b, & 6c

Example of RCPSA Applied to a High Pressure Feed

Composition (mol %) of Input and Output from RCPSA (18 ft$^3$) in H2 purification Feed is at 800 psig, 122 deg F. and Feed Rate is About 10.1 MMSCFD

TABLE 6a

Step Times in seconds are $t_F = 0.91$, $t_{CO} = 0.25$, $t_{CN} = 0$, $t_P = 0.33$, $t_{RP} = 0.33$

|  | feed | product | Tail-Gas |
|---|---|---|---|
| H2 | 74.0 | 99.99 | 29.5 |
| C1 | 14.3 | 0.01 | 37.6 |
| C2 | 5.2 | 0.00 | 14.0 |
| C3 | 2.6 | 0.00 | 7.4 |
| C4+ | 3.9 | 0.00 | 10.9 |
| H2S | 20 vppm | 0 | 55 vppm |
| total (MMSCFD) | 10.187 | 6.524 | 3.663 |
|  | 800 psig | 790 psig | 65 psig |

[a] Tail gas at 65 psig, H2 at 99.9% purity and 87% recovery

TABLE 6b

Step Times in seconds are $t_F = 0.91$, $t_{CO} = 0.25$, $t_{CN} = 0$, $t_P = 0.33$, $t_{RP} = 0.33$

|  | feed | product | Tail-Gas |
|---|---|---|---|
| H2 | 74.0 | 99.93 | 38.1 |
| C1 | 14.3 | 0.07 | 32.8 |
| C2 | 5.2 | 0.00 | 12.5 |
| C3 | 2.6 | 0.00 | 6.5 |
| C4+ | 3.9 | 0.00 | 9.6 |
| H2S | 20 vppm | 0 vppm | 49 vppm |
| total (MMSCFD) | 10.187 | 6.062 | 4.125 |
|  | 800 psig | 790 psig | 100 psig |

[b] Tail gas at 100 psig, H2 at 99.93% purity and 80.3% recovery

TABLE 6c

Step times in seconds are $t_F = 0.91$, $t_{CO} = 0.083$, $t_{CN} = 0.25$, $t_P = 0.167$, $t_{RP} = 0.41$

|  | feed | product | Tail-Gas |
|---|---|---|---|
| H2 | 74.0 | 99.95 | 28.9 |
| C1 | 14.3 | 0.05 | 39.0 |
| C2 | 5.2 | 0.00 | 13.7 |
| C3 | 2.6 | 0.00 | 7.2 |
| C4+ | 3.9 | 0.00 | 10.6 |
| H2S | 20 vppm | 0.01 vppm | 53 vppm |
| total (MMSCFD) | 10.187 | 6.373 | 3.814 |
|  | 800 psig | 790 psig | 65-100 psig |

[c] Tail gas from 65-100 psig, H2 at 99.8% purity and 84% recovery

Example 9

Tables 7a, 7b, and 7c compare the performance of RCPSA's operated in accordance with the invention being described here. The stream being purified has higher H$_2$ in the feed (85% mol) and is a typical refinery/petrochemical stream. In these examples the purity increase in product is below 10% (i.e. P/F<1.1). Under this constraint, the method of the present invention is able to produce hydrogen at >90% recovery without the need for tail gas compression.

Tables 7a, 7b, & 7c

Example of RCPSA Applied to a Feed with H2 Concentration (85 mol %)

Composition (mol %) of Input and Output from RCPSA (6.1 ft$^3$)

Feed is at 480 psig, 135 deg F. and Feed Rate is About 6 MMSCFD

TABLE 7a

Step Times in seconds are $t_F = 0.5$, $t_{CO} = 0.33$, $t_{CN} = 0.167$, $t_P = 0.167$, $t_{RP} = 1.83$ recovery = 85%

|  | feed | product | Tail-Gas |
|---|---|---|---|
| H2 | 85.0 | 92.40 | 57.9 |
| C1 | 8.0 | 4.56 | 17.9 |
| C2 | 4.0 | 1.79 | 13.1 |
| C3 | 3.0 | 1.16 | 10.4 |
| C4+ | 0.0 | 0.00 | 0.0 |
| H2O | 2000 | 866.5 | 6915 |
| total (MMSCFD) | 6.100 | 4.780 | 1.320 |
|  | 480 psig | 470 psig | 65 psig |

TABLE 7b

Step Times in sec. are $t_F = 1$, $t_{CO} = 0.333$, $t_{CN} = 0.167$, $t_P = 0.083$, $t_{RP} = 0.417$ recovery = 90%

|  | feed | product | Tail-Gas |
|---|---|---|---|
| H2 | 85.0 | 90.90 | 58.2 |
| C1 | 8.0 | 5.47 | 18.1 |
| C2 | 4.0 | 2.23 | 12.9 |
| C3 | 3.0 | 1.29 | 10.1 |
| C4+ | 0.0 | 0.00 | 0.0 |
| H2O | 2000 | 1070.5 | 6823 |
| total (MMSCFD) | 6.120 | 5.150 | 0.969 |
|  | 480 psig | 470 psig | 65 psig |

TABLE 7c

Step Times in sec. are $t_F = 2$, $t_{CO} = 0.667$, $t_{CN} = 0.333$, $t_P = 0.167$, $t_{RP} = 0.833$ recovery = 90%

|  | feed | product | Tail-Gas |
|---|---|---|---|
| H2 | 85.0 | 90.19 | 55.2 |
| C1 | 8.0 | 6.21 | 18.8 |
| C2 | 4.0 | 2.32 | 13.9 |
| C3 | 3.0 | 1.17 | 11.3 |
| C4+ | 0.0 | 0.00 | 0.0 |
| H2O | 2000 | 1103.5 | 7447 |
| total (MMSCFD) | 6.138 | 5.208 | 0.93 |
|  | 480 psig | 470 psig | 65 psig |

The invention claimed is:
1. A process for hydrocracking a hydrocarbon feed, comprising:
   a) contacting a hydrocarbon feed in a hydrocracking zone with a hydrogen-containing gas and a catalytically effective amount of a hydrocracking catalyst under hydrocracking conditions thereby resulting in a lower boiling hydrocarbon liquid phase and a vapor phase containing hydrogen and light hydrocarbons;

b) separating the lower boiling hydrocarbon liquid phase and the vapor phase;

c) removing at least a portion of the light hydrocarbons from at least a portion of the vapor phase, thereby increasing its hydrogen concentration, in a rapid cycle pressure swing adsorption unit containing a plurality of adsorbent beds and having a total cycle time of less than about 30 seconds and a pressure drop within each adsorbent bed of greater than about 5 inches of water per foot of bed length; and d) recycling at least a portion of the vapor phase of step c) above having an increased concentration of hydrogen to the hydrocracking zone;

wherein the removing step c) results in a recovery of a purified hydrogen-containing gas stream, relative to said hydrogen-containing make-up treat gas, said vapor phase product, or both, so as to exhibit (i) a rate of recovery (R%) greater than 80% for a product purity to feed ratio (P%/F%) greater than 1.1, (ii) a rate of recovery (R%) greater than 90% for a product purity to feed ratio (P%/F%) less than 1.1 but greater than 0, or (iii) both (i) and (ii).

2. The process of claim 1, wherein the hydrocarbon feed is selected from those boiling above about 350° F. (177° C.).

3. The process of claim 2, wherein the hydrocarbon feed is selected from the group consisting of naphtha boiling range feeds, kerosene boiling range feeds, and distillate boiling range feeds.

4. The process of claim 3, wherein the hydrocarbon fed is selected from the group consisting of Fischer-Tropsch liquids, lube stocks, raffinates, heavy naphthas, atmospheric gas oils, vacuum gas oils, deasphalted, vacuum, and atmospheric residua, hydrotreated or mildly hydrocracked residual oils, coker distillates, straight run distillates, solvent-deasphalted oils, pyrolysis-derived oils, high boiling synthetic oils, cycle oils and cat cracker distillates.

5. The process of claim 2, wherein the hydrocracking catalyst contains one or more components selected from the group consisting of cobalt, nickel, tungsten, alumina, a zeolite, silica, silica-alumina, and molecular sieve.

6. The process of claim 5, wherein the total cycle time is less than about 10 seconds and the pressure drop of each adsorbent bed is greater than about 10 inches of water per foot of bed length.

7. The process of claim 2, wherein the total cycle time of rapid cycle pressure swing adsorption is less than about 15 seconds.

8. The process of claim 7, wherein the total cycle time is less than about 5 seconds.

9. The process of claim 6, wherein the pressure drop of greater than about 20 inches of water per foot of bed length.

10. The process of claim 9, wherein the cycle time is less than about 5 seconds and the pressure drop is greater than about 20 inches of water per foot of bed length.

11. The process of claim 10, wherein a portion of the vapor phase is not treated in the rapid cycle pressure swing adsorption unit to remove light hydrocarbons and which portion is also recycled to the hydrocracking zone.

12. The process of claim 6, wherein the vapor stream is scrubbed with a basic scrubbing solution comprised of an amine prior to being conducted to the rapid cycle pressure swing adsorption unit.

13. The process of claim 6, wherein the rapid cycle pressure swing adsorption unit removes contaminants selected from the group consisting of $CO_2$, water, ammonia, and $H_2S$.

14. The process of claim 1, wherein the cycle time is less than about 10 seconds and the pressure drop is greater than about 10 inches of water per foot of bed length.

15. The process of claim 1, wherein said hydrogen-containing gas is comprised of a purified make-up gas produced from a hydrogen-containing make-up gas in a rapid cycle pressure swing adsorption unit containing a plurality of adsorbent beds and having a total cycle time of less than about 30 seconds and a pressure drop within each adsorbent bed of greater than about 5 inches of water per foot of bed length, wherein the purified make-up gas from the rapid cycle pressure swing adsorption unit is higher in hydrogen concentration than the hydrogen-containing gas.

16. The process of claim 15, wherein the hydrocarbon feed is selected from the group consisting of naphtha boiling range feeds, kerosene boiling range feeds, and distillate boiling range feeds.

17. The process of claim 15, wherein the cycle time is less than about 10 seconds and the pressure drop is greater than about 10 inches of water per foot of bed length.

18. The process of claim 17, wherein the cycle time is less than about 5 seconds and the pressure drop is greater than about 20 inches of water per foot of bed length.

19. The process of claim 1, wherein a portion of the vapor phase is not treated in the rapid cycle pressure swing adsorption unit to remove light hydrocarbons and which portion is also recycled to the hydrocracking zone.

20. The process of claim 1, wherein the hydrocracking process is shape selective, wherein the feed is selected from a distillate and a lubricating oil basestock and the pour point of the feed is reduced and the catalyst is comprised of a zeolite.

21. The process of claim 1, wherein the hydrocracking process is a shape selective distillate dewaxing, carried out at reaction conditions of 260 to 455° C., 20 to 50 kg/cm² hydrogen partial pressure, 1 to 2.5 LHSV, and 250 to 425 $Nm^3/m^3$ hydrogen circulation rate wherein a lower sulfur, lower pour point distillate product is produced.

22. The process of claim 1, wherein the hydrocracking process is shape selective lube dewaxing, carried out at reaction conditions of 500 to 750° F, 400 to 2000 psi, 1500 to 4000 scf/bbl, and 0.2 to 2 LHSV to produce a tower sulfur, lower pour point lube basestock is produced with an improved viscosity index.

23. The process of claim 1, wherein the hydrocracking process is shape selective lube dewaxing, carried out at reaction conditions of 500 to 750° F., 400 to 2000 psi, 1500 to 4000 scf/bbl, and 0.2 to 2 LHSV to produce a lower sulfur, lower pour point lube product is produced with an improved viscosity index.

* * * * *